(12) United States Patent
Kukunaga

(10) Patent No.: US 8,631,234 B2
(45) Date of Patent: Jan. 14, 2014

(54) APPARATUS AND METHOD FOR ESTABLISHING ENCRYPTION INFORMATION COMMON TO A PLURALITY OF COMMUNICATION PATHS COUPLING TWO APPARATUSES

(75) Inventor: Yoshiaki Kukunaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/045,776

(22) Filed: Mar. 11, 2011

(65) Prior Publication Data
US 2011/0228935 A1     Sep. 22, 2011

(30) Foreign Application Priority Data

Mar. 17, 2010   (JP) .................................. 2010-060530

(51) Int. Cl.
*H04L 9/18*     (2006.01)
*H04L 9/12*     (2006.01)

(52) U.S. Cl.
USPC ........................... 713/162; 713/153; 713/154

(58) Field of Classification Search
None
See application file for complete search history.

(56) References Cited

U.S. PATENT DOCUMENTS

| | | | | |
|---|---|---|---|---|
| 7,734,913 | B2 * | 6/2010 | Morino et al. | 713/161 |
| 2003/0217262 | A1 * | 11/2003 | Kawai et al. | 713/153 |
| 2006/0052085 | A1 * | 3/2006 | Gregrio Rodriguez et al. | 455/411 |
| 2007/0083669 | A1 * | 4/2007 | Tsirtsis et al. | 709/238 |
| 2007/0202892 | A1 * | 8/2007 | Voyer | 455/458 |
| 2008/0222716 | A1 | 9/2008 | Momoi | |
| 2010/0125899 | A1 * | 5/2010 | Tinnakornsrisuphap et al. | 726/12 |

FOREIGN PATENT DOCUMENTS

| | | |
|---|---|---|
| JP | 2004-328563 | 11/2004 |
| JP | 2004-350025 | 12/2004 |
| JP | 2008-219679 | 9/2008 |

OTHER PUBLICATIONS

C. Kaufman, Ed. "Internet Key Exchange (IKEv2) Protocol" Network Working Group, Request for Comments:4306, Dec. 2005.
P. Eronen, Ed. IKEv2 Mobility and Multihoming Protocol (MOBIKE), Network Working Group, Request for Comments: 4555, Jun. 2006.

* cited by examiner

*Primary Examiner* — Venkat Perungavoor
(74) *Attorney, Agent, or Firm* — Katten Muchin Rosenman LLP

(57) ABSTRACT

An apparatus includes a plurality of connection-source terminating units. Each of the plurality of connection-source terminating units constitutes an independent communication path coupled to a corresponding one of a plurality of connection-destination terminating units provided for a connection-destination apparatus. The apparatus establishes encryption information including first information used for encryption processing on communication performed via a plurality of the independent communication paths established between the apparatus and the connection-destination apparatus. The first information is used in common for all the plurality of the independent communication paths when packets are transmitted through the plurality of the independent communication paths established between the communication apparatus and the connection-destination apparatus.

8 Claims, 8 Drawing Sheets

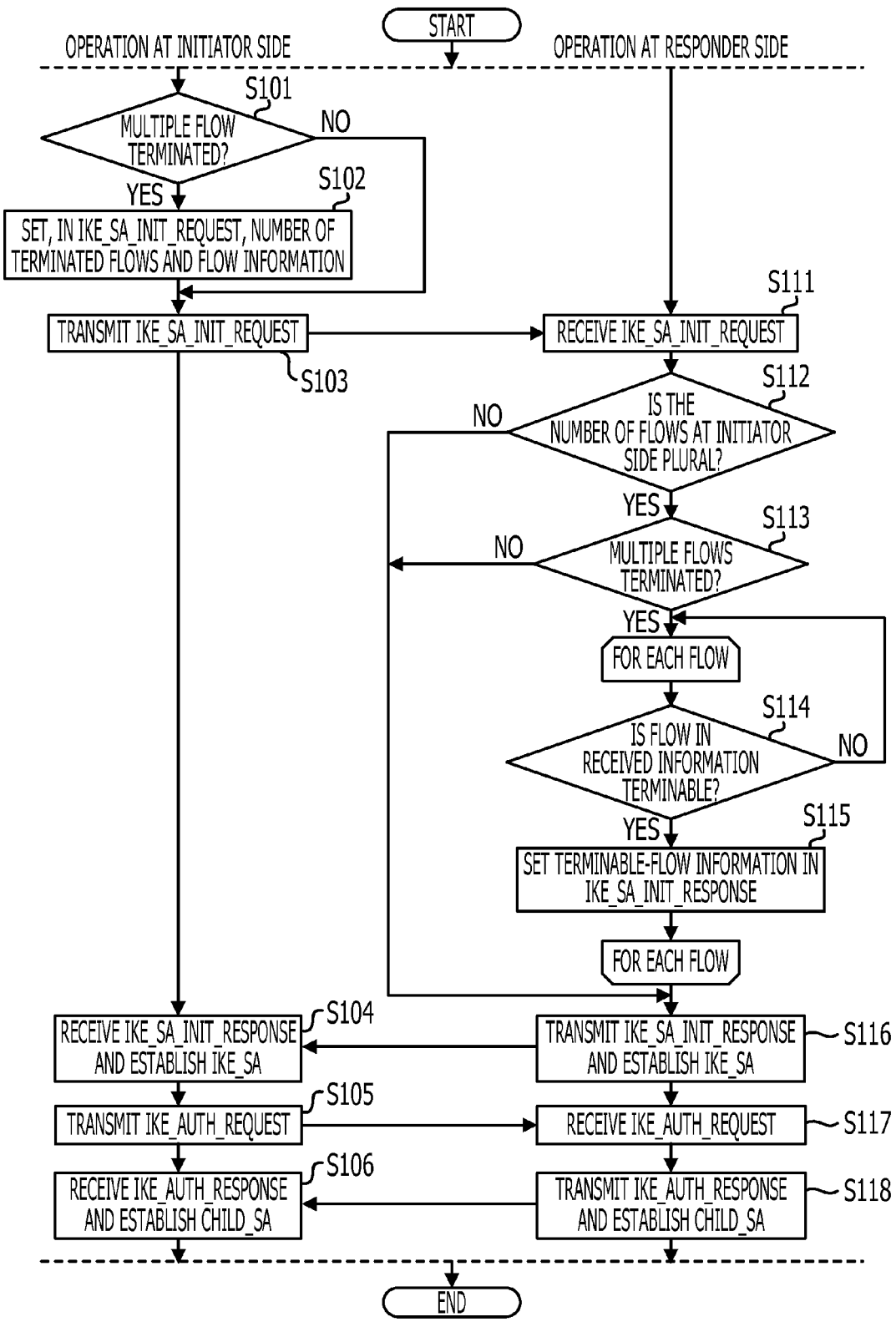

| ITEM | | CONTENT |
|---|---|---|
| COMMON PARAMETER SET (131) | ENCRYPTION ALGORITHM | 3des-cbc |
| | CRYPTOGRAPHIC KEY | zzzzzzzzzz |
| | AUTHENTICATION ALGORITHM | hmac-sha-1-96 |
| | AUTHENTICATION KEY | ccccccccc |
| | SPI | 0xaaaaaaaa |
| | LIFE DURATION | T [SECONDS/BYTES] |
| INDIVIDUAL PARAMETER SET (132) — FLOW #1 | SOURCE IP ADDRESS | IP1 |
| | DESTINATION IP ADDRESS | IP3 |
| | ESN APPLICATION | USED |
| | TRANSMISSION SEQUENCE NUMBER | 0 |
| | ANTI-REPLAY WINDOW | 0/0xbbbbbbbb |
| INDIVIDUAL PARAMETER SET — FLOW #2 | SOURCE IP ADDRESS | IP2 |
| | DESTINATION IP ADDRESS | IP4 |
| | ESN APPLICATION | USED |
| | TRANSMISSION SEQUENCE NUMBER | 0 |
| | ANTI-REPLAY WINDOW | 0/0xcccccccc |

APPARATUS AND METHOD FOR ESTABLISHING ENCRYPTION INFORMATION COMMON TO A PLURALITY OF COMMUNICATION PATHS COUPLING TWO APPARATUSES

CROSS-REFERENCE TO RELATED APPLICATION

This application is based upon and claims the benefit of priority of the prior Japanese Patent Application No. 2010-060530, filed on Mar. 17, 2010, the entire contents of which are incorporated herein by reference.

FIELD

A certain aspect of the embodiments discussed herein relates to a technical field of a communication apparatus, a communication method, and a communication system which perform communication involving, for example, encryption processing.

BACKGROUND

In order to protect communication data against fraudulent activities, such as eavesdropping and falsification, on networks, such as the Internet, counter measures involving performing encryption processing on communication data to be transmitted are taken. One known example of the encryption processing is a technology called IPsec (Security Architecture for Internet Protocol). In IPsec, SAs (security associations, e.g., IKE_SA and CHILD_SA) using an IKE (Internet Key Exchange protocol) are established between communication apparatuses (nodes) that perform communication. After the SA establishment, encryption processing and decryption processing of communication data are performed by referring to a SAD (SA database) that is a database managing the SAs.

In recent years, with the increased capacities and speeds of networks, a configuration in which multiple IP addresses are accommodated in one communication apparatus and multihoming using the multiple IP addresses is employed has been proposed in order to realize load distribution and path redundancy. That is, in the proposed configuration, communication paths are set for the respective IP addresses accommodated in one communication apparatus (in other words, multiple sets (flows) of IP addresses for communication are prepared) and the communication paths are simultaneously used to realize multihoming. For example, radio communication systems (such as an LTE (long term evolution) based radio communication system) including radio base stations called eNodeB and high-order stations, such as an S-GW (serving gateway) and an MME (mobility management entity), are intended to perform communication between one radio base station and the high-order station or communication between one radio base station and another radio base station adjacent thereto by using the aforementioned multihoming.

IPsec specifies that, when multiple IP addresses are accommodated in one communication apparatus, SAs are to be established as follows. As a first establishment method, a technology for establishing SAs for respective communication paths constituted by multiple IP addresses (i.e., SAs for respective IP addresses) is known, as defined in RFC (Request for Comment) 4306. That is, a technology for establishing multiple SAs is known. As a second establishment method, a technology in which an SA is established for one arbitrary communication path (i.e., one arbitrary IP address) and the established SA is switched when encryption processing for another communication path is performed is known, as defined in RFC 4555.

In terms of path redundancy, a configuration in which multiple communication apparatuses each having a single IP address can also be conceived. In this configuration, for example, a communication apparatus in a master state (or a communication apparatus in a normal system) and a communication apparatus in a backup state (or a communication apparatus in a standby system) are appropriately switched to realize path redundancy. A technology in which an SA used for encryption processing is pre-transferred to the communication apparatus in the master state while the communication apparatus in the master state performs communication involving encryption processing has also been proposed to eliminate a need for information exchange during switching from the communication apparatus in the master state to the communication apparatus in the backup state. In addition, a configuration in which, when one communication apparatus accommodates multiple communication paths, one of the communication paths is specified as an active line and one virtual address is assigned to the active line has also been proposed to realize path redundancy.

Examples of related art include Japanese Unexamined Patent Application Publication Nos. 2004-328563, 2004-350025, and 2008-219679.

Examples of the related art further include RFC 4306, Internet Key Exchange (IKEv2) Protocol and RFC 4555, MOBIKE Protocol.

SUMMARY

According to an aspect of an embodiment, a communication apparatus includes: connection-source terminating units, each constituting an independent communication path with a corresponding one of connection-destination terminating units; and an establishing unit that establishes a single piece of encryption information with a connection-destination apparatus having the connection-destination terminating units, the encryption information being used for encryption processing for communication performed between the connection-source terminating units and the corresponding connection-destination terminating units and being common to the communication paths.

BRIEF DESCRIPTION OF DRAWINGS

FIG. 3 is a flowchart illustrating an example of SA establishment processing of the communication system according to the present invention;

FIG. 4 is a data structure table illustrating one example of the contents of an SA established by the communication system according to the present invention;

DESCRIPTION OF EMBODIMENTS

Above-described SA establishment method proposed for a case in which multiple IP addresses are accommodated in one communication apparatus has technical problems as follows. In a technology for establishing SAs for respective communication paths constituted by multiple IP addresses, it is desirable to establish the SAs for all of the communication paths (in other words, for all of the IP addresses). Thus, the amount of time and processing load required until the SAs corresponding to all of the communication paths are established are very large. Although SAs corresponding to all communication paths do not need to be established in the technology in which the SA is switched, the processing load becomes relatively large since the SA-switching processing occurs frequently. In addition, after the SA is switched, communication using a communication path used before the switching cannot be performed. Thus, communication simultaneously using the communication paths corresponding to the respective IP addresses cannot be virtually performed.

A technology in which the communication apparatus in the master state and the communication apparatus in the backup state are switched as appropriate and a technology in which one virtual address is assigned to one active line of communication paths are not intended for a state in which communication is performed simultaneously using the multiple communication paths corresponding to the multiple IP addresses accommodated in one communication apparatus.

A communication system according to an embodiment of the present invention will be described below as one example of a best mode for carrying out the present invention, with reference to the accompanying drawings.

(1) Configuration of Communication System

Figure 1:
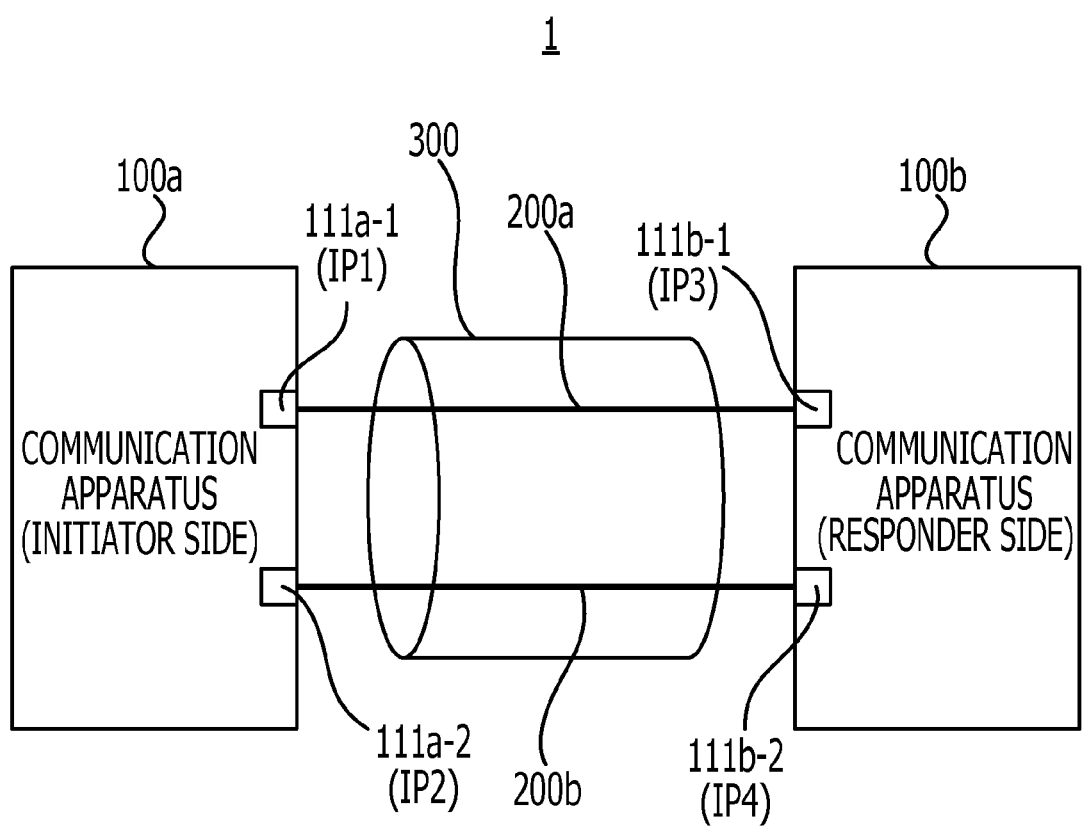
FIG. 1 is a block diagram illustrating a configuration of a communication system according to an exemplary embodiment of the present invention.

One example of the configuration of a communication system 1 according to an embodiment will be described with reference to FIG. 1. FIG. 1 is a block diagram of one example of the configuration of the communication system 1 according to an embodiment.

As illustrated in FIG. 1, the communication system 1 has an initiator-side communication apparatus 100a and a responder-side communication apparatus 100b, which are connected through a wired or wireless network. The configuration of the initiator-side communication apparatus 100a and the configuration of the responder-side communication apparatus 100b may be the same or may be different from each other. A description below will be given of an example in which the configuration of the initiator-side communication apparatus 100a and the configuration of the responder-side communication apparatus 100b are the same. Thus, when a description is given without distinction between the initiator-side communication apparatus 100a and the responder-side communication apparatus 100b, they may be referred as a "communication apparatus 100" hereinafter.

The communication apparatus 100a has transmission interface units 111a, each being assigned a unique IP (internet protocol) address. The transmission interface units 111a implement one embodiment of connection-source terminating units. In the example illustrated in FIG. 1, the communication apparatus 100a includes a transmission interface unit 111a-1 assigned an IP address "IP1" and a transmission interface unit 111a-2 assigned an IP address "IP2". Similarly, the communication apparatus 100b includes transmission interface units 111b, each being assigned a unique IP address. The transmission interface units 111b implement one embodiment of connection-destination terminating units. In the example illustrated in FIG. 1, the communication apparatus 100b includes a transmission interface unit 111b-1 assigned an IP address "IP3" and a transmission interface unit 111b-2 assigned an IP address "IP4".

The transmission interface unit 111a-1 included in the communication apparatus 100a and the transmission interface unit 111b-1 included in the communication apparatus 100b (or the IP address "IP1" assigned to the transmission interface unit 111a-1 and the IP address "IP3" assigned to the transmission interface unit 111b-1) constitute a flow 200a, which is a logical communication line or communication path. Similarly, the transmission interface unit 111a-2 included in the communication apparatus 100a and the transmission interface unit 111b-2 included in the communication apparatus 100b (or the IP address "IP2" assigned to the transmission interface unit 111a-2 and the IP address "IP4" assigned to the transmission interface unit 111b-2) constitute a flow 200b, which is a logical communication line or communication path.

In this exemplary embodiment, the flows 200a and 200b are accommodated in a single IPsec tunnel 300 defined by a single SA (security association) that is common to the flows 200a and 200b. Thus, communication between the transmission interface unit 111a-1 and the transmission interface unit 111b-1 and communication between the transmission interface unit 111a-2 and the transmission interface unit 111b-2 are subjected to encryption processing realized by the same SA.

The number of transmission interface units 111 (in other words, the number of IP addresses) illustrated in FIG. 1 is one example, and three or more transmission interface units 111, each being assigned a unique IP address, may be provided in one communication apparatus 100. That is, one communication apparatus 100 may accommodate three or more IP addresses.

All of the flows 200 corresponding to the IP addresses accommodated in one communication apparatus 100 do not need to be accommodated in the single IPsec tunnel 300. In other words, the state of the accommodation of the logical communication lines between the communication apparatus 100a and the communication apparatus 100b is an example as long as at least two flows 200 of multiple flows 200 are accommodated in the single IPsec tunnel 300. For example, the arrangement may be such that k flows 200 corresponding to the first to kth IP addresses of M IP addresses accommodated in one communication apparatus 100 (where M is an integer of 3 or greater and k is an integer that satisfies 1<k<M) are accommodated in a first IPsec tunnel 300 and M-k flows 200 corresponding to the (k+1)st to Mth IP addresses of the M IP addresses accommodated in one communication apparatus 100 are accommodated in a second IPsec tunnel 300. In such a case, it is preferable that a first SA that is common to the k flows 200 corresponding to the first to kth IP addresses and a second SA that is common to the M-k flows 200 corresponding to the (k+1)st to Mth IP addresses be established.

For simplicity of description, the communication system 1 illustrated in FIG. 1 has two communication apparatuses 100. Needless to say, however, the communication system 1 may have three or more communication apparatuses 100. Even in a case in which the communication system 1 has three or more communication apparatuses 100, it is preferable to configure the communication system 1 such that the state between arbitrary or desired two communication apparatuses 100 is the same as the state between two communication apparatuses 100 illustrated in FIG. 1. When a communication system including three or more communication apparatuses 100 is configured to perform processing described below, it is possible to offer the same advantages as those of the communication system 1 including two communication apparatuses 100.

(2) Configuration of Communication Apparatus

Figure 2:
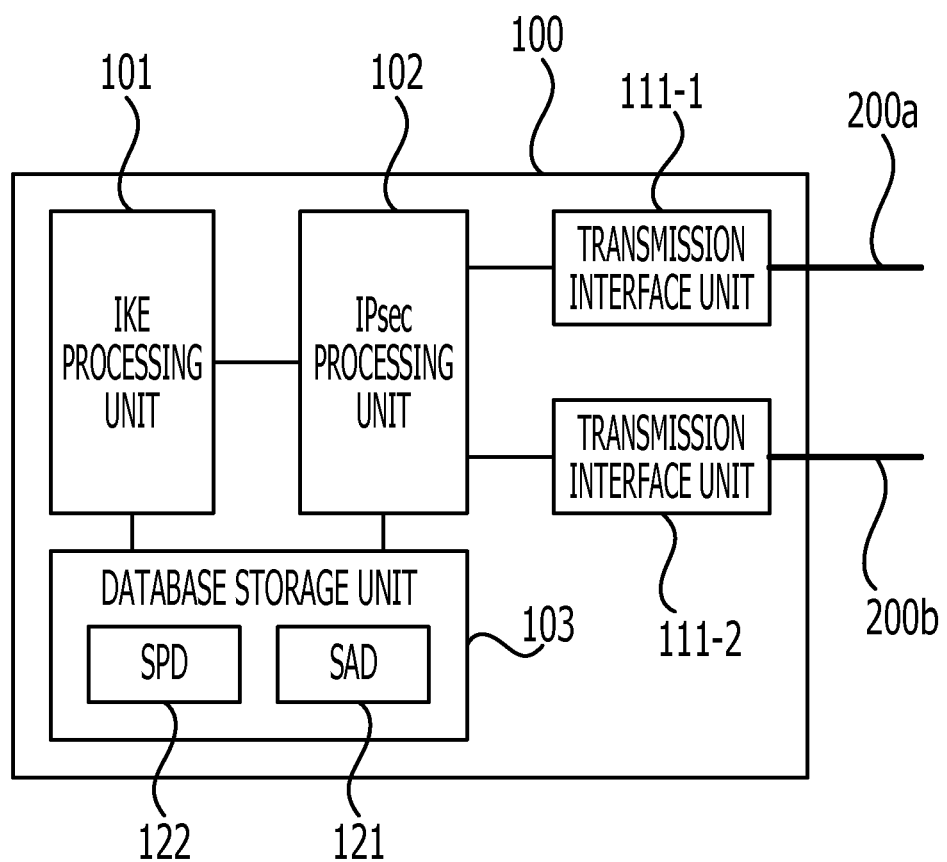
FIG. 2 is a block diagram illustrating one example of the configuration of a communication apparatus included in the communication system according to the present invention.

One example of the configuration of a communication apparatus 100 included in the communication system 1 according to the present invention will be described with reference to FIG. 2. FIG. 2 is a block diagram illustrating one example of the configuration of the communication apparatus 100 included in the communication system 1 according to the present invention.

As illustrated in FIG. 2, the communication apparatus 100 includes an IKE (Internet Key Exchange protocol) processing unit 101, an IPsec processing unit 102, a database storage unit 103, a transmission interface unit 111-1, and a transmission interface unit 111-2.

The IKE processing unit 101 implements one embodiment of an establishing unit, which establishes SAs (e.g., IKE_SA and CHILD_SA) by performing negotiation based on the IKE. In the exemplary embodiment, the IKE processing unit 101 establishes a single SA that is common to the transmission interface units 111-1 and 111-2 (in other words, that is common to multiple flows 200).

Using the SA established by the IKE processing unit 101, the IPsec processing unit 102 performs encryption processing on a packet to be transmitted. The packet subjected to the encryption processing is transferred to the transmission interface unit 111-1 or 111-2. That is, packet transmission processing is performed. Similarly, the IPsec processing unit 102 performs decryption processing on a packet transferred from the transmission interface unit 111-1 or 111-2. That is, packet reception processing is performed.

The database storage unit 103 stores an SAD (security association database) 121 for managing the SA established by the IKE processing unit 101 and an SPD (security policy database) 122 for managing an SP (security policy) for determining which SAD 121 is to be used. The database storage unit 103 has, for example, a semiconductor memory, such as a RAM (random access memory).

The transmission interface unit 111-1 transmits packets, transferred from the IPsec processing unit 102, to the transmission interface unit 111-1 included in another communication apparatus 100 at a transmission destination. And the transmission interface unit 111-1 transfers the packets, transmitted from the transmission interface unit 111-1 included in the communication apparatus 100 at the transmission destination, to the IPsec processing unit 102.

The transmission interface unit 111-2 transmits packets, transferred from the IPsec processing unit 102, to the transmission interface unit 111-2 included in the communication apparatus 100 at the transmission destination. And the transmission interface unit 111-2 transfers packets, transmitted from the transmission interface unit 111-2 included in the communication apparatus 100 at the transmission destination, to the IPsec processing unit 102.

(3) Example of Processing

An example of processing of the communication system 1 according to the present invention will be described below with reference to FIGS. 3 to 6.

(3-1) Example of SA Establishing Processing

An example of SA establishment processing of the communication system 1 according to the present invention will first be described with reference to FIG. 3. FIG. 3 is a flowchart illustrating an example of the SA establishment processing of the communication system 1 according to the present invention.

Referring to FIG. 3, in operation S101, the IKE processing unit 101 included in the communication apparatus 100a (i.e., the initiator-side communication apparatus 100) determines whether or not the communication apparatus 100a terminates multiple flows 200, that is, whether or not the communication apparatus 100a accommodates multiple IP addresses.

When the result of the determination in operation S101 indicates that the communication apparatus 100a terminates multiple flows 200 (i.e., Yes in operation S101), the process proceeds to operation S102. In operation S102, the IKE processing unit 101 included in the communication apparatus 100a sets, in an IKE_SA_INIT_request message for establishing an SA (e.g., IKE_SA), at least (i) the number of flows 200 terminated by the communication apparatus 100a and (ii) information for specifying each flow 200. For example, in the example illustrated in FIG. 1, the IKE processing unit 101 included in the communication apparatus 100a sets, in the IKE_SA_INIT_request message, "2" as the number of flows 200 terminated by the communication apparatus 100a. Similarly, in the example illustrated in FIG. 1, the IKE processing unit 101 included in the communication apparatus 100a sets, in the IKE_SA_INIT_request message, information for specifying the flow 200a. Examples of the information include a flow ID "#1" for identifying the flow 200a, the IP address "IP1" at the initiator-side (the communication apparatus 100a side) terminating point of the flow 200a, and the IP address "IP3" at the responder side (the communication apparatus 100b side) terminating point of the flow 200a. Similarly, in the example illustrated in FIG. 1, the IKE processing unit 101 included in the communication apparatus 100a sets, in the IKE_SA_INIT_request message, information for specifying the flow 200b. Examples of the information include a flow ID "#2" for identifying the flow 200b, the IP address "IP2" at the initiator-side (the communication apparatus 100a side) terminating point of the flow 200b, and the IP address "IP4" at the responder side (the communication apparatus 100b side) terminating point of the flow 200b.

In operation S103, the IKE processing unit 101 included in the communication apparatus 100a transmits the IKE_SA_INIT_request message to one of the transmission interface units 111b-1 and 111b-2, included in the communication apparatus 100b (i.e., the responder-side communication apparatus 100), via a corresponding one of the transmission interface units 111a-1 and 111a-2. In other words, in operation S103, the IKE processing unit 101 included in the communication apparatus 100a transmits the IKE_SA_INIT_request message to the communication apparatus 100b (i.e., the responder-side communication apparatus 100) by using one of the IP addresses "IP1" and "IP2" as a transmission source and using one of the IP addresses "IP3" and "IP4" as a transmission destination. The IP address used for transmitting the IKE_SA_INIT_request message may be preset. Alternatively, the IP address used for transmitting the IKE_SA_INIT_request message may be appropriately set each time the message is transmitted.

On the other hand, when the result of the determination in operation S101 indicates that the communication apparatus 100a does not terminate multiple flows 200 (i.e., No in operation S101), the IKE processing unit 101 included in the communication apparatus 100a performs processing in operation S103 without performing the processing in operation S102. That is, the IKE processing unit 101 included in the communication apparatus 100a transmits the IKE_SA_INIT_request message in accordance with a normal procedure performed when the communication apparatus 100a terminates one flow 200. When the communication apparatus 100a accommodates multiple IP addresses, the IKE processing unit 101 included in the communication apparatus 100a may perform the processing in operation S102.

In operation S111, the IKE processing unit 101 included in the communication apparatus 100b receives the IKE_SA_INIT_request message transmitted from the communication apparatus 100a.

In operation S112, on the basis of the IKE_SA_INIT_request message, the IKE processing unit 101 included in the communication apparatus 100b determines whether or not the communication apparatus 100a terminates multiple flows 200. For example, by referring to the number of flows 200 which is set in the IKE_SA_INIT_request message, the IKE processing unit 101 included in the communication apparatus 100b determines whether or not the communication apparatus 100a terminates multiple flows 200.

When the result of the determination in operation S112 indicates that the communication apparatus 100a does not terminate multiple flows 200 (i.e., No in operation S112), the process proceeds to operation S116. In operation S116, the IKE processing unit 101 included in the communication apparatus 100b transmits an IKE_SA_INIT_response message to the communication apparatus 100a without performing processing in operations S113 to S115 described below. That is, the IKE processing unit 101 included in the communication apparatus 100b transmits an IKE_SA_INIT_response message in accordance with a normal procedure performed when one flow 200 is constituted between the communication apparatus 100a and the communication apparatus 100b (i.e., when each of the communication apparatuses 100a and 100b accommodates one IP address). In operation S104, the IKE processing unit 101 included in the communication apparatus 100a receives the IKE_SA_INIT_response message transmitted from the communication apparatus 100b. Consequently, an IKE_SA (which is one example of SAs and is, for example, an SA used for protecting key exchange between the communication apparatus 100a and the communication apparatus 100b or for establishing a CHILD_SA) is established between the communication apparatus 100a and the communication apparatus 100b. In this case, the SA is established between only the IP addresses between which the IKE_SA_INIT_request message and the IKE_SA_INIT_response message have been transmitted/received.

In operation S105, on the basis of the SA established in operations S104 and S116, the IKE processing unit 101 included in the communication apparatus 100a transmits an IKE_AUTH_request message, which is a message for establishing an SA (e.g., CHILD_SA), to the communication apparatus 100b. In operation S117, the IKE processing unit 101 included in the communication apparatus 100b receives the IKE_AUTH_request message transmitted from the communication apparatus 100a. In operation S118, the IKE processing unit 101 included in the communication apparatus 100b transmits an IKE_AUTH_response message to the communication apparatus 100a. In operation S106, the IKE processing unit 101 included in the communication apparatus 100a receives the IKE_AUTH_response message transmitted from the communication apparatus 100b. Consequently, a CHILD_SA (which is one example of SAs and is, for example, an SA used for encrypting a packet actually transmitted/received) is established between the communication apparatus 100a and the communication apparatus 100b. In this case, the SA is established between only the IP addresses between which the IKE_SA_INIT_request message and the IKE_SA_INIT_response message have been transmitted/received.

On the other hand, when the result of the determination in operation S112 indicates that the communication apparatus 100a terminates multiple flows 200 (i.e., Yes in operation S112), the process proceeds to operation S113. In operation S113, the IKE processing unit 101 included in the communication apparatus 100b determines whether or not the communication apparatus 100b terminates multiple flows 200, that is, whether or not the communication apparatus 100b accommodates multiple IP addresses.

When the result of the determination in operation S113 indicates that the communication apparatus 100b does not terminate multiple flows 200 (i.e., No in operation S113), the process proceeds to operation S116. In operation S116, the IKE processing unit 101 included in the communication apparatus 100b transmits an IKE_SA_INIT_response message to the communication apparatus 100a without performing the processing in operations S113 to S115. That is, when it is determined that the communication apparatus 100b does not terminate multiple flows 200, the IKE processing unit 101 included in the communication apparatus 100b performs processing that is similar to the processing performed when it is determined that the communication apparatus 100a does not terminate multiple flows 200. Thereafter, processing that is similar to the processing performed when the communication apparatus 100a does not terminate multiple flows 200 is performed, so that SAs (e.g., IKE_SA and CHILD_SA) are established between the communication apparatus 100a and the communication apparatus 100b. In this case, the SA is established between only the IP addresses between which the IKE_SA_INIT_request message and IKE_SA_INIT_response message have been transmitted/received.

On the other hand, when the result of the determination in operation S113 indicates that the communication apparatus 100b terminates multiple flows 200 (i.e., Yes in operation S113), the process proceeds to operation S114. In operation S114, the IKE processing unit 101 included in the communication apparatus 100b determines whether or not the communication apparatus 100b can terminate each of the flows 200 set in the IKE_SA_INIT_request message transmitted from the communication apparatus 100a. For example, when the IP address at the responder-side terminating point of each flow 200 set in the IKE_SA_INIT_request message transmitted from the communication apparatus 100a matches the IP address accommodated by the communication apparatus 100b, it may be determined that the communication apparatus 100b can terminate each flow 200 set in the IKE_SA_INIT_request message. On the other hand, when the IP address at the responder-side terminating point of each flow 200 set in the IKE_SA_INIT_request message transmitted from the communication apparatus 100a does not match the IP address accommodated by the communication apparatus 100b, it may be determined that the communication apparatus 100b cannot terminate each flow 200 set in the IKE_SA_INIT_request message.

When the result of the determination in operation S114 indicates that the communication apparatus 100b can terminate each flow 200 set in the IKE_SA_INIT_request message transmitted from the communication apparatus 100a (i.e., Yes in operation S114), the process proceeds to operation S115. In operation S115, the IKE processing unit 101 included in the communication apparatus 100b sets, in an IKE_SA_

INIT_response message, information for specifying the flow 200 determined to be terminable. The IKE processing unit 101 included in the communication apparatus 100*b* performs the processing in operation S114 on a next flow 200.

On the other hand, when the result of the determination in operation S114 indicates that the communication apparatus 100*b* cannot terminate each flow 200 set in the IKE_SA_INIT_request message transmitted from the communication apparatus 100*a* (i.e., No in operation S114), the IKE processing unit 101 included in the communication apparatus 100*b* performs the processing in operation S114 on the next flow 200 without setting, in the IKE_SA_INIT_request message, information for specifying the flow 200 determined to be terminable.

The processing in operation S114 and the processing in operation S115 are sequentially performed on the flows 200 set in the IKE_SA_INIT_request message transmitted from the communication apparatus 100*a*. For example, in the example illustrated in FIG. 1, the processing in operation S114 and the processing in operation S115 are performed on the flow 200*a* and the processing in operation S114 and the processing in operation S115 are performed on the flow 200*b*.

As described above, the IKE_SA_INIT_response message, the IKE_AUTH_request message, and the IKE_AUTH_ response message are transmitted/received between the communication apparatus 100*a* and the communication apparatus 100*b*, so that SAs are established therebetween (in operations S104 to S106 and operations S116 to S118). In this case, an SA is established not only between the IP addresses between which the IKE_SA_INIT_request message and the IKE_SA_INIT_response message have been transmitted/received but also between other IP addresses. That is, an SA that is common to the multiple flows 200 is established.

The SA established when both the communication apparatuses 100*a* and 100*b* can terminate multiple flows 200, out of the SAs established by the above-described processing, will be described below in more detail with reference to FIG. 4. FIG. 4 is a data structure table illustrating one example of the contents of the SA established by the communication system 1 according to the present invention.

As illustrated in FIG. 4, the SA (or the SAD 121 that manages the SA) includes, for example, a common parameter set 131 that is common to all of the flows 200. The SA includes independent parameter sets 132, each being unique to a corresponding one of flows 200, according to the number of flows 200.

The common parameter set 131 includes an encryption algorithm indicating an algorithm for encrypting packets based on the SA, a cryptographic key used for the encryption algorithm, an authentication algorithm indicating an algorithm for performing authentication processing on packets based on the SA, an authentication key used for the authentication algorithm, an SPI (security parameter index) used for specifying the SA, and a life duration indicating a usable time and an amount of use of the SA. In the example of the common parameter set 131 illustrated in FIG. 4, the encryption algorithm is 3des-cbc, the cryptographic key is zzzzzzzzzz, the authentication algorithm is hmac-sha-1-96, the authentication key is cccccccccc, and the SPI is 0xaaaaaaaa, and the life duration is T seconds/bytes. It is preferable that the common parameter set 131 be exchanged or transmitted/received between the communication apparatus 100*a* and the communication apparatus 100*b* in an identifiable form common to all of the flows 200 through use of the IKE_SA_INIT_request message, IKE_SA_INIT_response message, IKE_AUTH_request message, and IKE_AUTH_response message.

The individual parameter set 132 includes a source IP address (an initiator-side IP address) exchanged using the IKE_SA_INIT_request message and IKE_SA_INIT_response message, a destination IP address (a responder-side IP address) exchanged using the IKE_SA_INIT_request message and IKE_SA_INIT_response message, an ESN application information indicating whether or not an ESN (enhanced sequence number) is used, a transmission sequence number added to a packet subjected to encryption processing using a CHILD_SA, and an anti-replay window used for verifying a sequence number when a packet subjected to encryption processing is received. FIG. 4 illustrates an example in which the individual parameter sets 132 are provided for both a flow 200 (#1) and a flow 200 (#2). In FIG. 4, in the example of the individual parameter set 132 for the flow 200 (#1), the source IP address is IP1, the destination IP address is IP3, the ESN application information is "used", the transmission sequence number is 0, and the anti-replay window is 0/0xbbbbbbbb. In the example of the individual parameter set 132 for the flow 200 (#2), the source IP address is IP2, the destination IP address is IP4, the ESN application information is "used", the transmission sequence number is 0, and the anti-replay window is 0/0xcccccccc. It is preferable that the individual parameter set 132 be exchanged or transmitted/received between the communication apparatus 100*a* and the communication apparatus 100*b* in a form identifiable for each flow 200 through use of the IKE_SA_INIT_request message, IKE_SA_INIT_response message, IKE_AUTH_request message, and IKE_AUTH_response message.

An SA established when both of the communication apparatus 100*a* and the communication apparatus 100*b* cannot terminate multiple flows 200 has the same data structure as that of an SA in the related art. Thus, in the exemplary embodiment, a detailed description of an SA established when both of the communication apparatus 100*a* and the communication apparatus 100*b* cannot terminate multiple flows 200 is not given for simplicity of description.

(3-2) Example of Packet (Data) Transmission Processing

Figure 5:
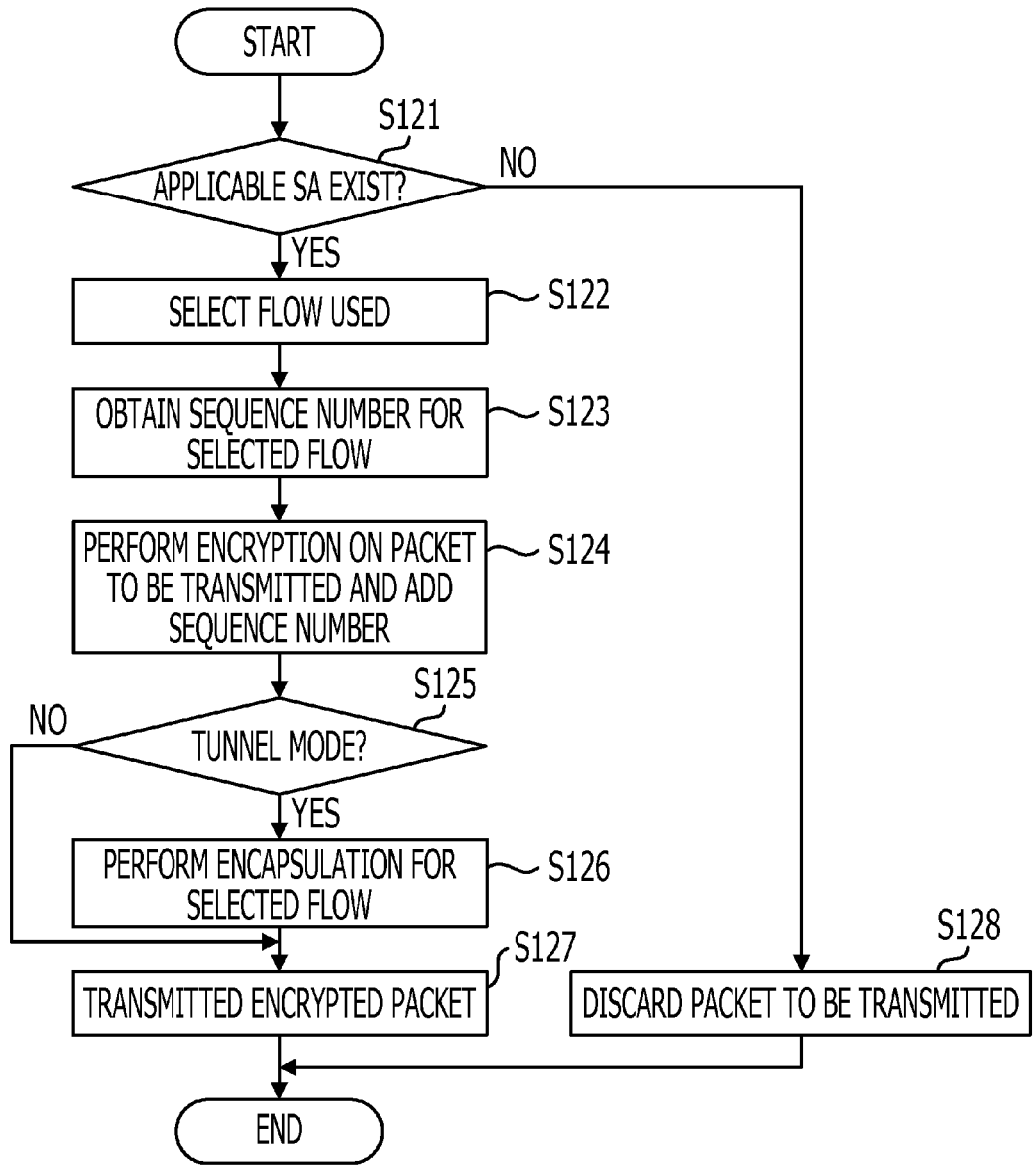
FIG. 5 is a flowchart illustrating an example of packet (data) transmission processing of the communication system according to the present invention.

An example of packet (data) transmission processing of the communication system 1 according to the present invention will be described with reference to FIG. 5. FIG. 5 is a flowchart illustrating an example of packet (data) transmission processing of the communication system 1 according to the present invention. An example of processing when the initiator-side communication apparatus 100*a* transmits a packet to the responder-side communication apparatus 100*b* will be described with reference to FIG. 5. That is, transmission processing performed by the initiator-side communication apparatus 100*a* will be described. Similar processing may also be performed when the responder-side communication apparatus 100*b* transmits a packet to the initiator-side communication apparatus 100*a*.

Referring to FIG. 5, in operation S121, the IPsec processing unit 102 determines whether or not an SA that can be applied to a packet to be transmitted exists. For example, the IPsec processing unit 102 may determine whether or not an SA that specifies encryption processing for the flow 200 used for packet transmission is managed by the SAD 121.

When the result of the determination in operation S121 indicates that an SA that can be applied to a packet to be transmitted does not exist (i.e., No in operation S121), the process proceeds to operation S128 in which the IPsec processing unit 102 discards the packet to be transmitted. The IPsec processing unit 102 then ends the transmission processing. Alternatively, the IPsec processing unit 102 may repeatedly perform the processing in operation S121 and subsequent operations on a next packet to be transmitted.

When the result of the determination in operation S121 indicates that an SA that can be applied to a packet to be transmitted exists (i.e., Yes in operation S121), the process proceeds to operation S122 in which the IPsec processing unit 102 selects the flow 200 used for transmitting the packet. For example, in the example illustrated in FIG. 1, the IPsec processing unit 102 selects, of the flows 200a and 200b, the flow 200 used for transmitting the packet. The IPsec processing unit 102 implements one example of a selecting unit. When the packet transmission mode is a tunnel mode, one flow 200 may be selected or multiple flows 200 may be selected. When the packet transmission mode is a transport mode, it is preferable that one flow 200 be selected but multiple flows 200 may also be selected.

In operation S123, the IPsec processing unit 102 refers to the SAD 121 to obtain a sequence number from the individual parameter set 132 corresponding to the flow 200 selected in operation S122. In operation S124, the IPsec processing unit 102 performs encryption processing on the packet by referring to the common parameter set 131 included in the SA managed by the SAD 121 and also adds the sequence number obtained in operation S123 to the packet subjected to the encryption processing.

In operation S125, the IPsec processing unit 102 determines whether or not the packet transmission mode is the tunnel mode.

When the result of the determination in operation S125 indicates that the packet transmission mode is the tunnel mode (i.e., Yes in operation S125), the IPsec processing unit 102 randomly, regularly, or periodically assigns the packet to the flow(s) 200 selected in operation S122, to thereby encapsulate the packet subjected to the encryption processing in operation S126. In operation S127, the IPsec processing unit 102 transmits the packet, subjected to the encryption processing, to the responder-side communication apparatus 100b.

On the other hand, when the result of the determination in operation S125 indicates that the packet transmission mode is not the tunnel mode (i.e., that the packet transmission mode is the transport mode; No in operation S125), the process proceeds to operation S127 in which the IPsec processing unit 102 transmits the packet, subjected to the encryption processing, to the responder-side communication apparatus 100b.

(3-3) Example of Packet (Data) Reception Processing

Figure 6:
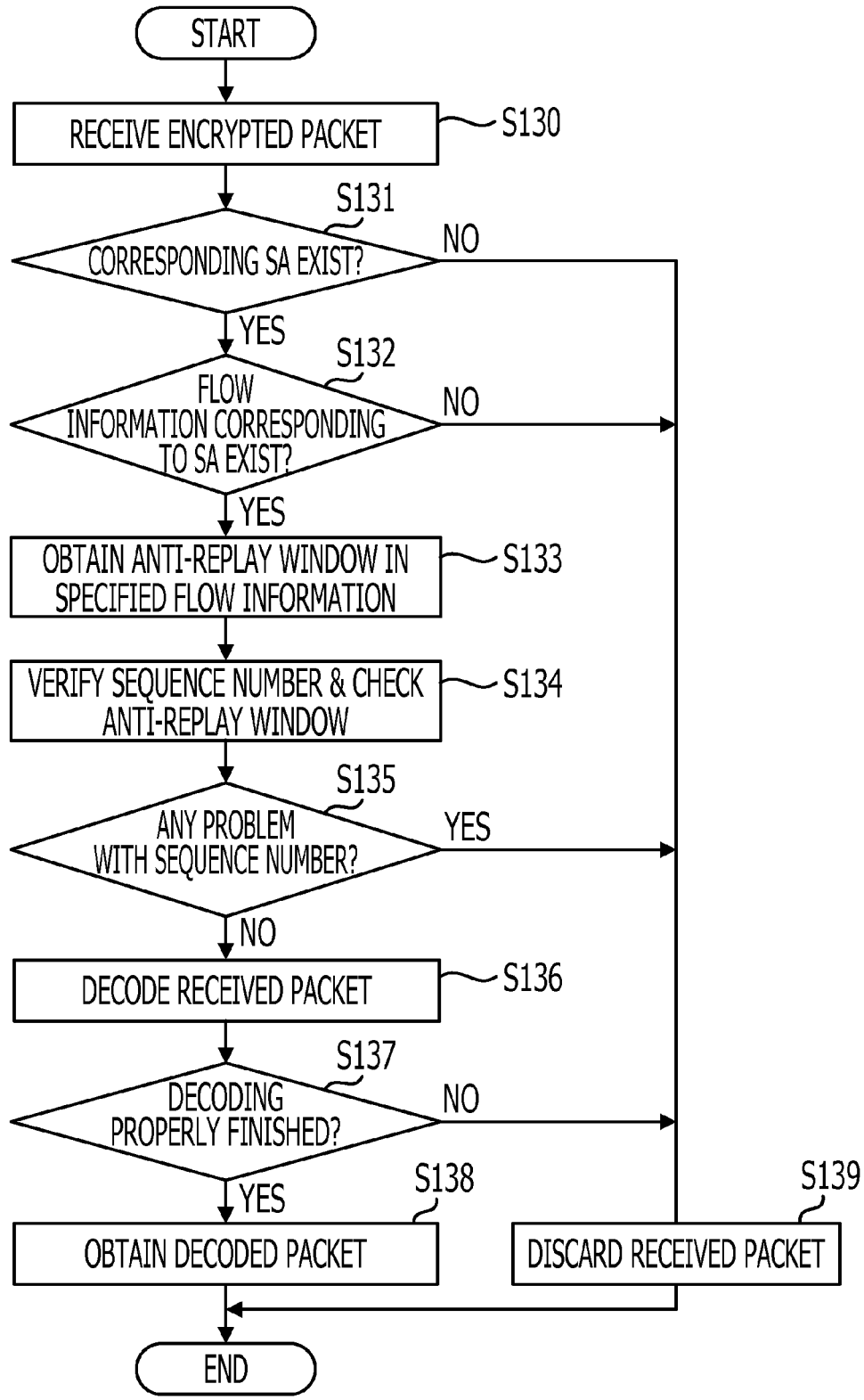
FIG. 6 is a flowchart illustrating an example of packet (data) reception processing of the communication system according to the present invention.

An example of packet (data) reception processing of the communication system 1 according to the present invention will be described with reference to FIG. 6. FIG. 6 is a flowchart illustrating an example of packet (data) reception processing of the communication system 1 according to the present invention. An example of processing when the responder-side communication apparatus 100b receives a packet transmitted from the initiator-side communication apparatus 100a will be described with reference to FIG. 6. That is, reception processing performed by the responder-side communication apparatus 100b will be described. Similar processing may also be performed when the initiator-side communication apparatus 100a receives a packet transmitted from the responder-side communication apparatus 100b.

Referring to FIG. 6, in operation S130, the IPsec processing unit 102 receives an encrypted packet. In operation S131, the IPsec processing unit 102 determines whether or not an SA that can be applied to the received packet exists. For example, when an SPI included in a header portion of the received packet matches an SPI included in the common parameter set 131 in the SA managed by the SAD 121, the IPsec processing unit 102 may determine that an SA that can be applied to the received packet exists.

When the result of the determination in operation S131 indicates that an SA that can be applied to the received packet does not exist (i.e., No in operation S131), the process proceeds to operation S139 in which the IPsec processing unit 102 discards the received packet. The IPsec processing unit 102 then ends the reception processing. Alternatively, the IPsec processing unit 102 may repeatedly perform the processing in operation S131 and subsequent operations on a next received packet.

On the other hand, when the result of the determination in operation S131 indicates that an SA that can be applied to the received packet exists (i.e., Yes in operation S131), the process proceeds to operation S132. In operation S132, the IPsec processing unit 102 determines whether or not the SA managed by the SAD 121 includes an individual parameter set 132 for the flow 200 used during reception of the packet. For example, when the SA managed by the SAD 121 includes an individual parameter set 132 including a source IP address and a destination IP address that are the same as the source IP address and destination IP address of the received packet, the IPsec processing unit 102 may determine that the SA managed by the SAD 121 includes an individual parameter set 132 for the flow 200 used during reception of the packet.

When the result of the determination in operation S132 indicates that the SA managed by the SAD 121 does not include an individual parameter set 132 for the flow 200 used during reception of the packet (i.e., No in operation S132), the process proceeds to operation S139 in which the IPsec processing unit 102 discards the received packet. The IPsec processing unit 102 then ends the reception processing. Alternatively, the IPsec processing unit 102 may repeatedly perform the processing in operation S131 and the subsequent operations on a next received packet.

On the other hand, when the result of the determination in operation S132 indicates that the SA managed by the SAD 121 includes an individual parameter set 132 for the flow 200 used during reception of the packet (i.e., Yes in operation S132), the process proceeds to operation S133 in which the IPsec processing unit 102 obtains an anti-replay window from the individual parameter set 132 for the flow 200 used during reception of the packet. In operation S134, the IPsec processing unit 102 verifies the sequence number while checking the anti-replay window obtained in operation S133.

In operation S135, the IPsec processing unit 102 determines whether or not there is any problem with the sequence-number verification performed in operation S134.

When the result of the determination in operation S135 indicates that there is a problem with the sequence-number verification performed in operation S134 (i.e., Yes in operation S135), the process proceeds to operation S139 in which the IPsec processing unit 102 discards the received packet. The IPsec processing unit 102 then ends the reception processing. Alternatively, the IPsec processing unit 102 may repeatedly perform the processing in operation S131 and the subsequent operations on a next received packet.

On the other hand, when the result of the determination in operation S135 indicates that there is no problem with the sequence-number verification performed in operation S134 (i.e., No in operation S135), the process proceeds to operation S136. In operation S136, by referring to the common parameter set 131 included in the SA managed by the SAD 121, the IPsec processing unit 102 performs decryption processing on the packet subjected to the encryption processing.

In operation S137, the IPsec processing unit 102 determines whether or not the decryption processing in operation S136 has been properly performed.

When the result of the determination in operation S137 indicates that the decryption processing in operation S136 has not been properly performed (i.e., No in operation S137), the process proceeds to operation S139 in which the IPsec processing unit 102 discards the received packet. The IPsec processing unit 102 then ends the reception processing. Alternatively, the IPsec processing unit 102 may repeatedly perform the processing in operation S131 and the subsequent operations on a next received packet.

On the other hand, when the result of the determination in operation S137 indicates that the decryption processing in operation S136 has been properly performed (i.e., Yes in operation S137), the process proceeds to operation S138 in which the IPsec processing unit 102 obtains the packet subjected to the decryption processing.

According to the communication system 1 of the exemplary embodiment, one SA that is common to multiple flows 200 can be established. That is, according to the communication system 1 of the exemplary embodiment, encrypted communications for the respective flows 200 can be accommodated in one common SA. Thus, the amounts of time load and processing load required for establishing the SA can be reduced compared to a configuration in which SAs are independently established for multiple flows 200. A description will be given of a comparative example in which the number of messages used for establishing one SA is 4, the number of responder-side communication apparatuses 100b is 500, and the number of IP addresses accommodated in each of the responder-side communication apparatus 100b is 2. In the comparative example, when the initiator-side communication apparatus 100a individually establishes SAs for the respective flows 200, the communication apparatus 100a transmits/receives 4000 (=4×2×500) messages. On the other hand, according to the communication system 1 of the exemplary embodiment, it is sufficient for the initiator-side communication apparatus 100a to transmit/receive 2000 (=4×1×500) messages. The reduction in the amounts of the time load and processing load required for establishing the SAs becomes more prominent as the number of IP addresses accommodated in each communication apparatus 100b increases.

According to the communication system 1 of the exemplary embodiment, since one SA that is common to multiple flows 200 can be established, there is no need to perform SA switching at the time of switching between the flows 200 used for actual communication. In other words, since simultaneous communication using the multiple flows 200 can be performed based on the common SA, there is no need to switch between the flows 200 by switching the SA. Thus, it is possible to perform synchronous communication using the multiple flows 200 on the basis of the common SA, while reducing overhead for the processing time required for the SA switching.

In typical SA-switching processing, only the source IP address and destination IP address specified by the SA are rewritten. Consequently, a post-switching SA may maintain pre-switching states of the sequence number and the anti-replay window. Thus, there may be cases in which the sequence number and the anti-replay window are not properly checked. However, according to the communication system 1 of the exemplary embodiment, independent parameter sets 132, each being unique to a corresponding one of flows 200, can be contained in one SA with respect to all flows 200. In other words, information included in the common SA can be managed separately as the common parameter set 131 and the independent parameter sets 132. Thus, even when communication using the multiple flows 200 is performed, the appropriate parameter set can be referred to for each flow 200. Accordingly, the sequence number and the anti-replay window can be properly checked for each flow 200.

When one communication apparatus 100 can terminate multiple flows 200, the communication apparatus 100 obtains and exchanges, for each of the flows 200, information used for establishing the SA. Thus, according to the communication system 1 of the exemplary embodiment, one SA that is common to multiple flows 200 can preferably be established.

During packet transmission/reception, the communication apparatus 100 performs encryption processing and so on after obtaining the individual parameter sets 132 corresponding to the flows 200 used for the transmission/reception. Thus, even when one SA that is common to the multiple flows 200 is established, appropriate transmission/reception can be performed for each of the flows 200.

In the tunnel mode, the communication apparatus 100 can simultaneously transmit multiple packets for the same destination, by using the multiple flows 200. Thus, it is possible to more preferably realize load distribution corresponding to the assignment of the flows 200.

(4) Example of Application to Radio Communication System

Figure 7:
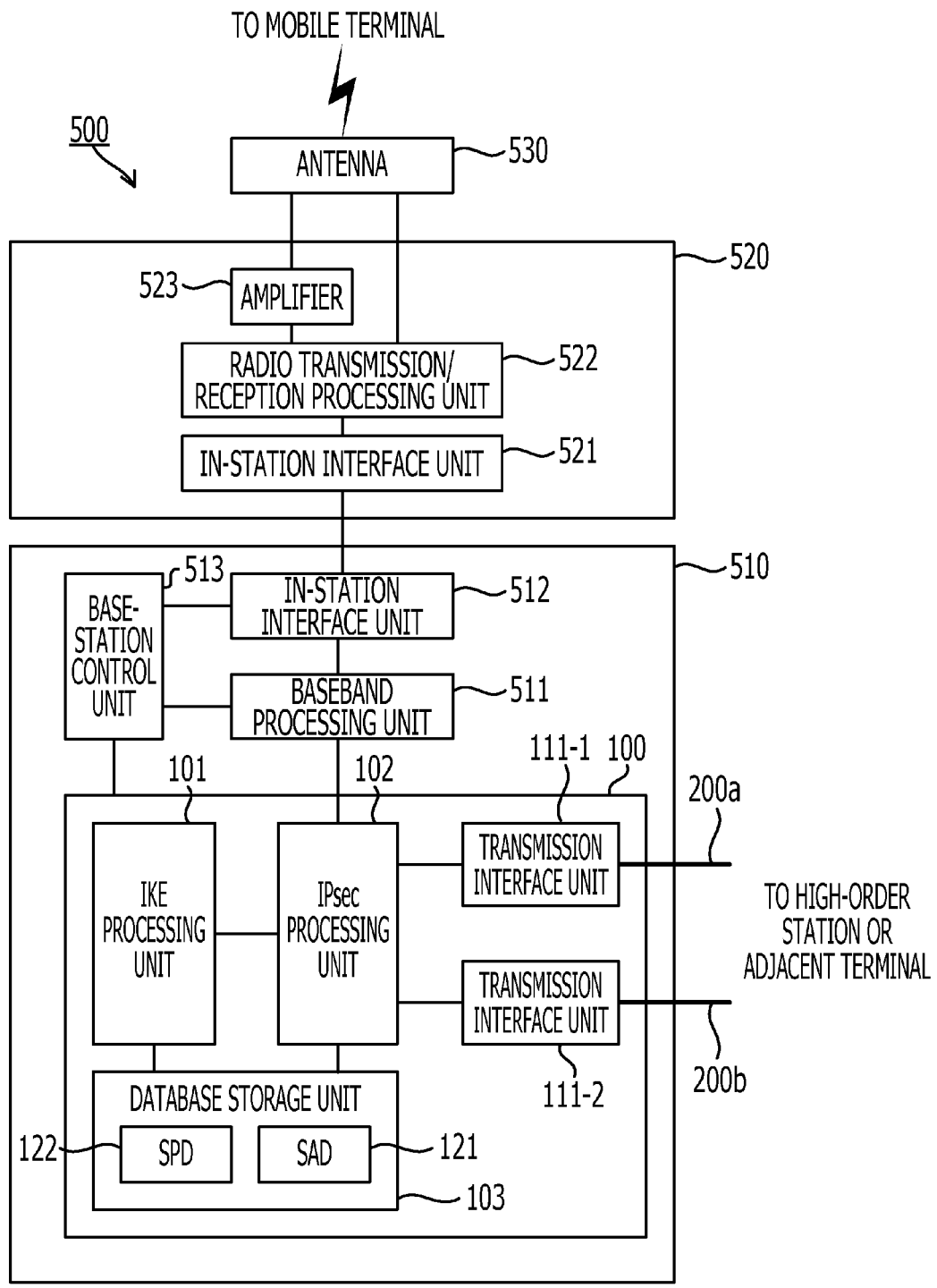
FIG. 7 is a block diagram illustrating one example of the configuration of a radio base station to which the communication apparatus of the exemplary embodiment is applied.
Figure 8:
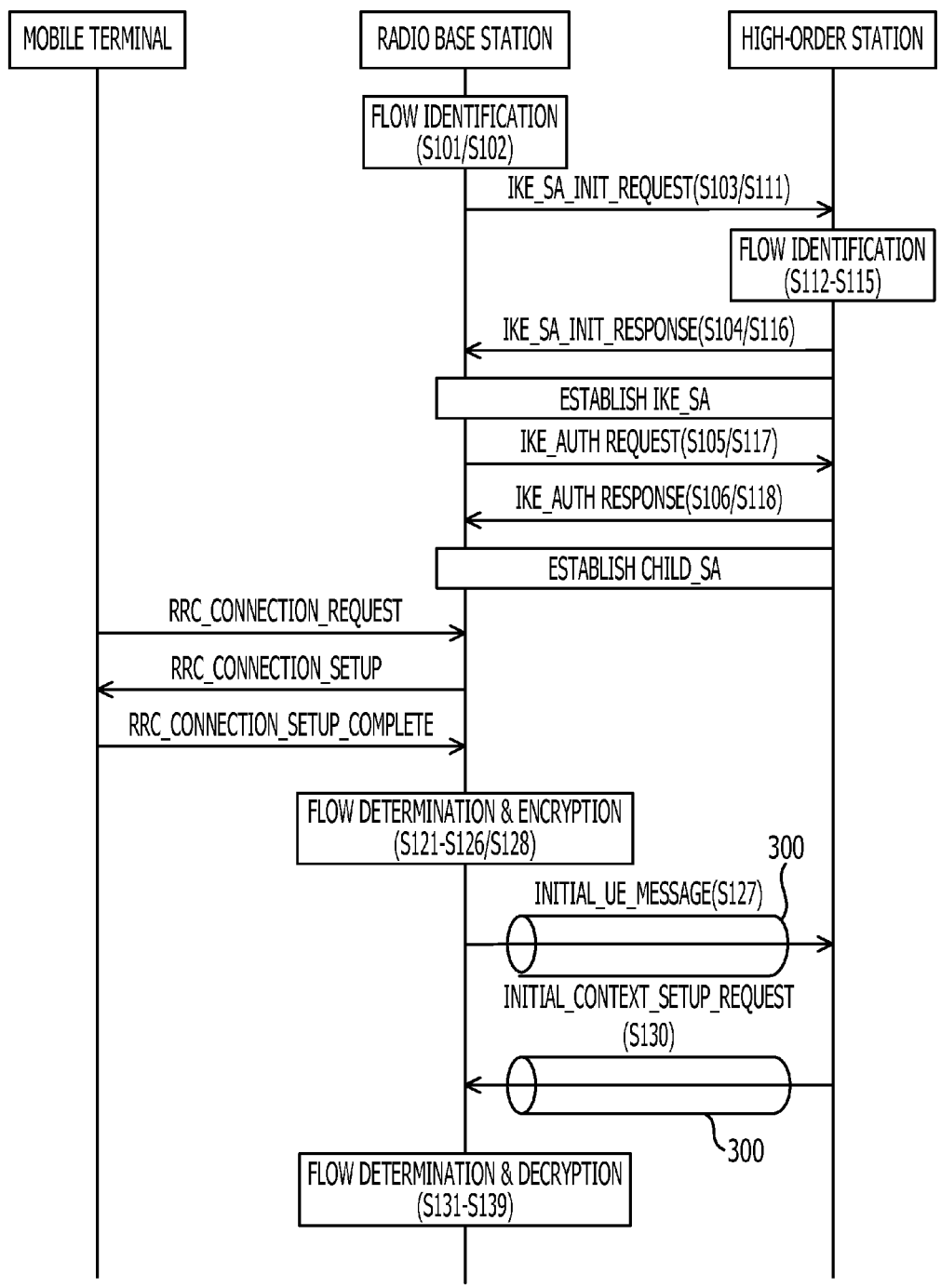
FIG. 8 is a sequence diagram illustrating an example of processing of a radio communication system including the radio base station.

An example of a case in which the above-described communication apparatus 100 is applied to a radio base station used in a radio communication system for mobile phones or the like will now be described with reference to FIGS. 7 and 8. FIG. 7 is a block diagram illustrating one example of the configuration of a radio base station 500 to which the communication apparatus 100 of the present invention is applied and FIG. 8 is a sequence diagram illustrating an example of processing of a radio communication system including the radio base station 500. A radio base station described below corresponds to a radio base station that complies with an LTE (long term evolution) standard. The communication apparatus 100 of the present invention may also be applied to a radio base station that complies with any standard other than the LTE standard.

As illustrated in FIG. 7, the radio base station (eNB, eNodeB) 500 includes a radio equipment control (REC) 510, radio equipment (RE) 520, and an antenna (or an ALD (antenna line device)) 530. The radio equipment control 510 includes the above-described communication apparatus 100, a baseband processing unit 511, an in-station interface unit 512, and a base-station control unit 513. The radio equipment 520 includes an in-station interface unit 521, a radio transmission/reception processing unit 522, and an amplifier 523.

When data is transmitted from the radio base station 500 to a mobile terminal (UE: user equipment, not illustrated), the baseband processing unit 511 is controlled by the base-station control unit 513 to perform baseband processing on data to be transmitted to the mobile terminal. The baseband processing unit 511 transfers the data, subjected to the baseband processing, to the radio equipment 520 via the in-station interface unit 512. The radio transmission/reception processing unit 522 performs radio signal processing (RF signal processing) on the data transferred from the radio equipment control 510 via the in-station interface unit 521. After the amplifier 523 performs amplification processing, the radio transmission/reception processing unit 522 transmits the resulting data to the mobile terminal via the antenna 530. Through the processing, data transmission (i.e., downlink radio communication) is performed.

When the radio base station 500 receives data from the mobile terminal (not illustrated), the radio transmission/reception processing unit 522 receives the data, transmitted from the mobile terminal, via the antenna 530. The radio transmission/reception processing unit 522 performs radio signal processing on the received data. The radio transmission/reception processing unit 522 transfers the data, subjected to the radio signal processing, to the radio equipment control 510 via the in-station interface unit 521. Under the control of the base-station control unit 513, the baseband processing unit 511 performs baseband processing on the data transferred from the radio equipment 520 via the in-station interface unit 512. Through the processing, data reception (i.e., uplink radio communication) is performed.

When the radio base station 500 transmits/receives data to/from another radio base station 500 that is adjacent thereto or to/from a high-order station, such as an MME (mobility management entity) or an S-GW (serving gateway), processing that is substantially the same as the above-described processing of the communication apparatus 100 is performed. More specifically, as illustrated in FIG. 8 as one example of a sequence for establishing an initial connection, the radio base station 500 performs the processing in operations S101 to S106 described above and illustrated in FIG. 3. The high-order station performs the processing in operations S111 to S118 described above and illustrated in FIG. 3. Consequently, an SA is established between the radio base station 500 and the high-order station. An RRC_Connection_request message is transmitted from the mobile terminal to the radio base station 500 in order to establish an RRC (radio resource connection) between the mobile terminal and the radio base station 500. Subsequently, an RRC_Connection_Setup message is transmitted from the radio base station 500 to the mobile terminal. Thereafter, an RRC_Connection_Setup_Complete message is transmitted from the mobile terminal to the radio base station 500. Consequently, an RRC is established between the mobile terminal and the radio base station 500. Subsequently, an INITIAL_UE_MESSAGE is transmitted from the radio base station 500 to the high-order station. The processing is performed based on the operations described above and illustrated in FIG. 5. Thereafter, an INITIAL_Context_Setup_request message is transmitted from the high-order station to the radio base station 500. The processing is performed based on the operations described above and illustrated in FIG. 6. After the processing, each time data is transmitted from the radio base station 500 to the high-order station, processing based on the operations described above and illustrated in FIG. 5 is performed, and each time data is transmitted from the high-order station to the radio base station 500, processing based on the operations described above and illustrated in FIG. 6 is performed.

According to the radio base station 500, the above-described processing performed by the communication apparatus 100 is applied to communication between the radio base station 500 and the high-order station or communication between the radio base station 500 and another radio base station 500 adjacent or close thereto. With this arrangement, the radio base station 500 can offer advantages that are substantially the same as those of the above-described communication apparatus 100.

According to the communication apparatus described above, encryption processing can be performed based on a single piece of encryption information that is common to the communication paths corresponding to the connection-source terminating units. Thus, the amounts of time load and processing load required for establishing encryption information can be reduced compared to a configuration in which pieces of encryption information are independently established for the communication paths corresponding to the connection-source terminating units. Since the common encryption information is established, there is no need to perform encryption-information switching at the time of switching of the communication paths. In other words, since simultaneous communication using the multiple communication paths can be performed based on the common encryption information, there is no need to switch between the communication paths by switching the communication information. Thus, it is possible to perform synchronous communication using the multiple communication paths on the basis of the common communication information, while reducing overhead for the processing time required for encryption-information switching.

Thus, the above-described communication method and communication system can offer advantages that are substantially the same as those of the above-described communication apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although an embodiment of the present invention has been described in detail, it should be understood that various changes, substitutions, and alternations could be made hereto without departing from the spirit and scope of the invention.

The invention claimed is:

1. A communication apparatus comprising:
a plurality of connection-source terminating units, each constituting an independent communication path coupled to a corresponding one of a plurality of connection-destination terminating units provided for a connection-destination apparatus; and
an establishing unit that establishes encryption information including first information used for encryption processing on communication performed via a plurality of the independent communication paths established between the plurality of connection-source terminating units and the plurality of connection-destination terminating units, wherein
the first information is used in common to all the plurality of the independent communication paths; and
when transmitting first and second packets using respective first and second paths included in the plurality of independent communication paths, the encryption processing is performed on the first and second packets using the same first information, and the first and second packets on which the encryption processing has been performed using the first information are transmitted concurrently via the first and second paths between the communication apparatus and the connection-destination apparatus.

2. The communication apparatus according to claim 1, wherein the encryption information includes second information for each of the plurality of the independent communication paths in addition to the first information that is common to the plurality of individual communication paths.

3. The communication apparatus according to claim 2, wherein the second information includes at least one of information specifying the connection-source terminating unit, information specifying the connection-destination terminating unit, a sequence number for achieving consistency of communication in the communication path, and information used for verifying the sequence number.

4. The communication apparatus according to claim 2, wherein the first information includes at least one of information specifying an algorithm used for encryption processing, information specifying a cryptographic key used for the encryption processing, information specifying an algorithm used for authentication processing, information for specifying an authentication key used for the authentication processing, identification information for identifying the encryption information, and information for specifying a period in which the encryption information is used.

5. The communication apparatus according to claim 1, wherein, by exchanging, for each of the plurality of the independent communication paths, information used for the encryption processing with the connection-destination apparatus, the establishing unit establishes the encryption information including the exchanged information.

6. The communication apparatus according to claim 1, further comprising:
   a selecting unit that selects, when communication using one of the plurality of communication paths is to be performed, an information portion corresponding to the one of the plurality of the independent communication paths from the encryption information and that performs encryption processing based on the selected information portion; and
   a communicating unit that performs communication using the one of the plurality of the independent communication paths.

7. A communication method for a communication apparatus including connection-source terminating units, the communication method comprising:
   establishing, for each of the connection-source terminating units, an independent communication path coupled to a corresponding one of a plurality of connection-destination terminating units provided for a connection-destination apparatus; and
   establishing encryption information including first information used for encryption processing on communication performed via a plurality of the independent communication paths established between the plurality of connection-source terminating units and the plurality of connection-destination terminating units, wherein
   the first information is used in common to all the plurality of the independent communication paths; and
   when transmitting first and second packets using respective first and second paths included in the plurality of independent communication paths, the encryption processing is performed on the first and second packets using the same first information, and the first and second packets on which the encryption processing has been performed using the first information transmitted concurrently via the first and second paths between the communication apparatus and the connection-destination apparatus.

8. A communication system comprising:
   a connection-destination communication apparatus having a plurality of connection-destination terminating units; and
   a connection-source communication apparatus comprising:
      a plurality of connection-source terminating units, each constituting an independent communication path coupled to a corresponding one of the plurality of connection-destination terminating units, and
      an establishing unit that establishes encryption information including first information used for encryption processing on communication performed via a plurality of the individual communication paths established between the plurality of connection-source terminating units and the plurality of connection-destination terminating units, wherein
   the first information is used in common to all the plurality of the independent communication paths; and
   when transmitting first and second packets using respective first and second paths included in the plurality of independent communication paths, the encryption processing is performed on the first and second packets using the same first information, and the first and second packets on which the encryption processing has been performed using the first information are transmitted concurrently via the first and second paths between the communication apparatus and the connection-destination apparatus.

* * * * *